United States Patent
Kim

(10) Patent No.: US 8,681,094 B2
(45) Date of Patent: Mar. 25, 2014

(54) DISPLAY APPARATUS AND METHOD FOR CONTROLLING DISPLAY APPARATUS

(75) Inventor: Young-kook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 373 days.

(21) Appl. No.: 12/822,633

(22) Filed: Jun. 24, 2010

(65) Prior Publication Data

US 2011/0025599 A1  Feb. 3, 2011

(30) Foreign Application Priority Data

Jul. 31, 2009  (KR) .................. 10-2009-0070455

(51) Int. Cl.
*G09G 5/00* (2006.01)
(52) U.S. Cl.
USPC ........................... 345/156; 345/212; 345/213
(58) Field of Classification Search
USPC ............... 345/156, 169, 204, 211, 213, 159; 710/302, 304
See application file for complete search history.

(56) References Cited

U.S. PATENT DOCUMENTS

| 4,922,448 | A | 5/1990 | Kunieda et al. |
| 7,123,248 | B1 | 10/2006 | Lafleur |
| 7,406,607 | B2 * | 7/2008 | Echizenya ............ 713/300 |
| 2004/0212610 | A1 * | 10/2004 | Hamlin ............ 345/211 |
| 2005/0141851 | A1 * | 6/2005 | Nakayama et al. ............ 386/46 |
| 2005/0162336 | A1 | 7/2005 | McClintock et al. |
| 2006/0119603 | A1 | 6/2006 | Chen et al. |
| 2008/0318465 | A1 * | 12/2008 | Johnsen et al. ............ 439/488 |
| 2009/0077606 | A1 | 3/2009 | Machida et al. |
| 2009/0146979 | A1 * | 6/2009 | Noorbakhsh et al. ......... 345/204 |

FOREIGN PATENT DOCUMENTS

| JP | 02-277123 A | 11/1990 |
| WO | 2005/057385 A1 | 6/2005 |

OTHER PUBLICATIONS

Extended European Search Report issued on Sep. 9, 2010 in counterpart European Application No. 10166899.4.

* cited by examiner

*Primary Examiner* — Andrew Sasinowski
(74) *Attorney, Agent, or Firm* — Sughrue Mion, PLLC

(57) ABSTRACT

A display apparatus and a method for controlling the display apparatus are provided. If a display apparatus is in a power off state and an interface is connected to a cable, an output of a cable connection sensing signal is blocked. Accordingly, the display apparatus may be able to report its power off state to an external device.

13 Claims, 7 Drawing Sheets

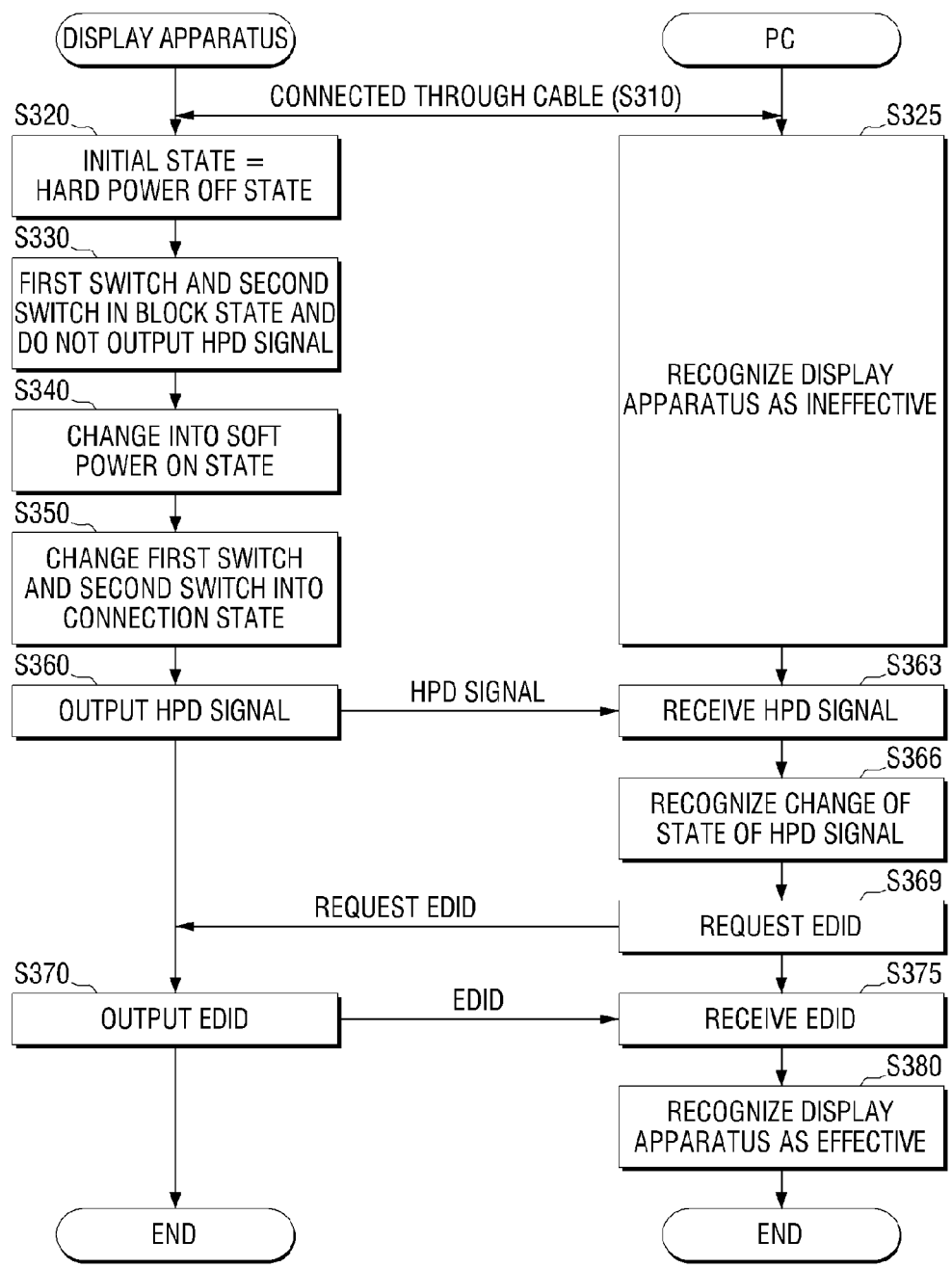

DISPLAY APPARATUS AND METHOD FOR CONTROLLING DISPLAY APPARATUS

CROSS-REFERENCE TO RELATED APPLICATIONS

This application claims priority from Korean Patent Application No. 10-2009-0070455, filed on Jul. 31, 2009 in the Korean Intellectual Property Office, the disclosure of which is incorporated herein by reference in its entirety.

BACKGROUND OF THE INVENTION

1. Field of the Invention

Apparatuses and methods consistent with the present invention relate to a display apparatus and a method for controlling the display apparatus, and more particularly, to a display apparatus which externally reports whether the display apparatus is powered up using a cable connection sensing signal, and a method for controlling the display apparatus.

2. Description of the Related Art

Recently, personal computers (PCs) have been incorporating a hot plug function for automatically detecting whether or not a display apparatus is connected to PCs. If a display apparatus is connected to a PC through a cable, the PC automatically recognizes the display apparatus, so a user can easily use the display apparatus.

However, as long as a PC is connected to a display apparatus through a cable, the PC may recognize the display apparatus as effective regardless of whether the display apparatus is turned on or off. That is, even when the display apparatus is turned off, the PC determines that the display apparatus is effective even though the user has no intention to use the display apparatus.

However, when the display apparatus is turned off, the user may wish that the PC recognizes the display apparatus as ineffective. Therefore, there is a need for a display apparatus capable of externally reporting whether the display apparatus is powered down.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides a display apparatus which blocks output of a cable connection sensing signal if the display apparatus is powered down when an interface of the display apparatus is connected to a cable, and a method for controlling the display apparatus.

According to an exemplary aspect of the present invention, there is provided a display apparatus which may include an interface which connectable to a cable and is operable to transmit and receives signals; a first switch which is operable to output a cable connection sensing signal; and a control unit which controls the first switch to block an output the cable connection sensing signal if the display apparatus is in a power off state and the interface is connected to the cable.

The power off state may include a hard power off state.

The power off state may include a soft power off state.

If the display apparatus is in a soft power on state, the control unit may further control the first switch to output the cable connection sensing signal through the interface.

The cable connection sensing signal may be a Hot Plug Detect (HPD) signal.

The display apparatus may further include a memory which stores extended display identification data (EDID), and a second switch which is operable to output of the EDID stored in the memory.

If a state for blocking the cable connection sensing signal changes to a state for outputting the cable connection sensing signal, the control unit may control the second switch to output the EDID stored in the memory through the interface.

The second switch may output the EDID stored in the memory by connecting the memory to a display data channel (DDC) line connected to the interface.

The interface may be one of a Digital Video Interactive (DVI) interface and a High-Definition Multimedia Interface (HDMI) interface.

According to another exemplary aspect of the present invention, there is provided a method for controlling a display apparatus, the method may include determining whether the display apparatus is in a power off state and whether the interface is connected to a cable; and blocking an output of a cable connection sensing signal if the display apparatus is in the power off state and the interface is connected to the cable.

The display apparatus may further include a first switch which is operable to perform the blocking of the cable connection sensing signal.

The power off state may include a hard power off state.

The power off state may include a soft power off state.

The method may further include determining whether the display apparatus is in a soft power on state; and controlling the first switch to output the cable connection sensing signal through the interface if the display apparatus is in a soft power on state.

The cable connection sensing signal may be a Hot Plug Detect (HPD) signal.

The apparatus may further include a memory and a second switch, and the method may further include: controlling the second switch to output extended display identification data (EDID) stored in the memory through the interface if a state for not outputting the cable connection sensing signal changes to a state for outputting the cable connection sensing signal.

The second switch may output the EDID from the memory to the interface by connecting the memory to a display data channel (DDC) line connected to the interface.

The interface may be one of a Digital Video Interactive (DVI) interface or a High-Definition Multimedia Interface (HDMI) interface.

BRIEF DESCRIPTION OF THE DRAWINGS

The above and/or other aspects of the present invention will be more apparent by describing certain exemplary embodiments of the present invention with reference to the accompanying drawings, in which:

FIG. 3 is a flow chart showing in detail that a display apparatus changes from a hard power off state to a soft power on state according to an exemplary embodiment of the present invention;

DETAILED DESCRIPTION OF EXEMPLARY EMBODIMENTS OF THE INVENTION

Figure 1:
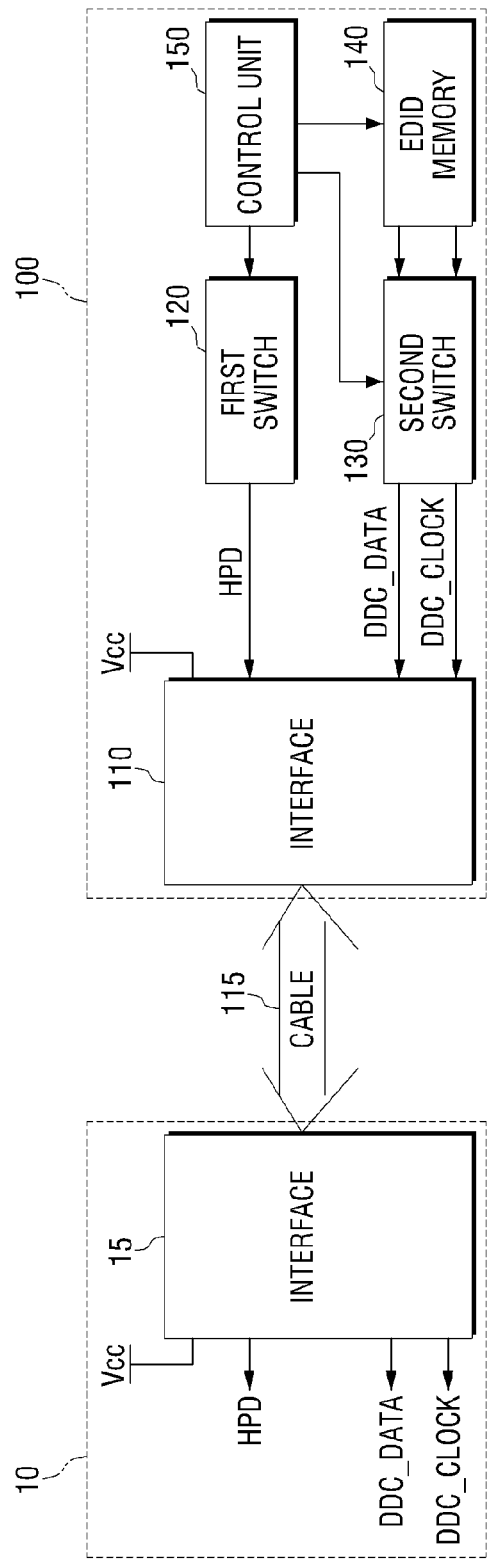
FIG. 1 is a schematic block diagram of a PC and a display apparatus according to an exemplary embodiment of the present invention.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

As used herein, the phrase "hard power on" and "hard power off" refers to a powering on or powering off due to a hardware switching (e.g., power on/off switch, etc.) or a drop in a power supply signal (e.g., unplugging the device from a power source, etc.). Also, as used herein, the phrase "soft power on" and "soft power off" refers to a powering on or powering off due to a software switching (e.g., activation of a screen saver or a power saving mode, etc.). It should be noted that the above examples of are not all inclusive, and that the scope of the present invention is not limited thereto.

FIG. 1 is a schematic block diagram of a personal computer (PC) 10 and a display apparatus 100 according to an exemplary embodiment of the present invention.

As illustrated in FIG. 1, the PC 10 and the display apparatus 100 are connected through a cable 115. The PC 10 transmits image data to the display apparatus 100 through the cable 115.

The PC 10 processes image data to be displayed on the display apparatus 100, and transmits the image data to the display apparatus 100 through an interface 15. In addition, the PC 10 controls the display apparatus 100 to operate in a single monitor mode or a dual monitor mode. In the single monitor mode, the PC 10 displays the image data using a single display apparatus, and in the dual monitor mode, the PC 10 displays the image data using two display apparatuses. It is also possible for the PC 10 to display the image data using three display apparatuses or more.

The PC 10 receives a hot plug detect (HPD) signal, a DDC_DATA signal, and a DDC_CLOCK signal from the display apparatus 100 through the interface 15 connected to the cable 115.

An HPD signal is a kind of cable connection sensing signal which is used to detect whether or not the display apparatus 100 is connected to the cable 115. For example, if the PC 10 receives an HPD signal (that is, if the HPD signal is high), the PC 10 determines that the display apparatus 100 is connected to the cable 115. If the PC 10 does not receive an HPD signal (that is, if the HPD signal is low), the PC 10 determines that the display apparatus 100 is disconnected from the cable 115. An HPD signal is transmitted through power (Vcc) of the PC 10.

A DDC_DATA signal and a DDC_CLOCK signal are input or output through a display data channel (DDC) line. The PC 10 receives extended display identification data (EDID) information from the display apparatus 100 through the DDC line. EDID is a data structure provided a display apparatus, including information on the display apparatus. Accordingly, if the PC 10 receives EDID, the PC 10 can know which kind of display 100 is connected thereto. EDID may include name of manufacturer, kind of product, EDID version, kind of fluorescent substance or filter, timing, size of screen, luminance, pixels, and the like.

The cable 115 is used to transport data including images. The same kind or different kinds of interface connecting jacks are disposed at both ends of the cable 115. For example, a digital video interactive connecting jack or a high-definition multimedia interface connecting jack may be disposed at both ends of the cable 115.

As described above, the PC 10 detects whether the display apparatus 100 is connected to the cable 115 using the HPD signal, and detects the type of the display apparatus 100 and effectiveness of the display apparatus using the EDID information.

As illustrated in FIG. 1, the display apparatus 100 may include an interface 110, a first switch 120, a second switch 130, an EDID memory 140, and a control unit 150.

The interface 110 externally transmits and receives a signal. More specifically, the interface 110 is connected to the PC 10 through the cable 115 to receive an image signal from the PC 10 and transmit an HPD signal, a DDC_DATA signal, and a DDC_CLOCK signal to the PC 10. The interface 110 is an image interface to transmit a digital image. In greater detail, the interface 110 may be a digital video interactive (DVI) or a high-definition multimedia interface (HDMI).

The first switch 120 is disposed between the interface 110 and the control unit 150 to output or block a cable connection sensing signal. More specifically, when the display apparatus 100 is in a hard power off state, the first switch 120 blocks output of a cable connection sensing signal (that is, in a blocking state or a switch-off state). When the display apparatus 100 is in the hard power off state, power is not supplied to the control unit 150, so the control unit 150 cannot control the first switch 120. Accordingly, when the display apparatus 100 is in the hard power off state, the first switch 120 maintains the blocking state in itself.

In addition, when the display apparatus 100 is in a soft power off state, the first switch 120 blocks output of a cable connection sensing signal. However, the display apparatus 100 is in a soft power on state, the first switch 120 outputs a cable connection sensing signal (that is, in a connection state or a switch-on state).

The second switch 130 connects or disconnects a display data channel (DDC) line so as to switch EDID output of the EDID memory 140. More specifically, when the display apparatus 100 is in the hard power off state, the second switch 130 blocks output of the DDC line (that is, in the blocking state or the switch-off state). When the display apparatus 100 is in the hard power off state, power is not supplied to the control unit 150, so the control unit 150 cannot control the second switch 130. Accordingly, when the display apparatus 100 is in the hard power off state, the first switch 120 maintains the blocking state in itself.

In addition, when the display apparatus 100 is in the soft power off state, the second switch 130 blocks output of the DDC line. However, the display apparatus 100 is in the soft power on state, the second switch 130 enables output of the DDC line (that is, in the connection state or the switch-on state).

The hard power off state indicates that power is not supplied to the display apparatus 100, for example, when the power code is pulled out. The soft power off state indicates that even if power is supplied to the display apparatus 100, the display apparatus 100 is turned off using the power-off button. The soft power on state indicates that the display apparatus 100 is turned on and thus displays an image on screen.

The first switch 120 and the second switch 130 may be implemented with any elements having a switching function. For example, the first switch 120 and the second switch 130 may be multiplexers.

The EDID memory 140 stores EDID, and may be implemented with an electrically erasable programmable read-only memory (EEPROM).

The control unit 150 controls the overall operation of the display apparatus 100. More specifically the control unit 150 controls the display apparatus to display an image corresponding to an image signal input by the PC 10.

If the interface 110 is connected to the cable 115 and the display apparatus 100 is in a power off state, the control unit 150 controls the first switch 120 to block output of a cable connection sensing signal. The power off state includes the hard power off state and the soft power off state.

More specifically, if the display apparatus 100 is in the soft power off state, the control unit 150 controls the first switch 120 to block output of a cable connection sensing signal. If the display apparatus 100 is in the soft power on state, the control unit 150 controls the first switch 120 to output a cable connection sensing signal through the interface 110.

In addition, if a state for not outputting a cable connection sensing signal changes to a state for outputting a cable connection sensing signal, the control unit 150 controls the second switch 130 to output EDID stored in the EDID memory 140 through the interface 110. That is, in a state for not outputting an HPD signal, if an HPD signal is output, the control unit 150 controls the second switch 130 to be switched on so as to output EDID to the PC 10, and controls the EDID memory 140 to output EDID.

As described above, if the display apparatus 100 is in the soft power off state or the hard power off state, the first switch 120 and the second switch 130 are in the block state, so the PC 10 recognizes that the PC 10 is disconnected from the display apparatus 100. Therefore, when the display apparatus 100 is in the power off state, the PC 10 recognizes in the same manner when the cable 115 is not connected.

Accordingly, if the PC 10 uses two display apparatuses in the dual monitor mode and one display apparatus is powered down, the PC 10 recognizes that the one display apparatus is powered down, and can change into the single monitor mode.

Figure 2A:
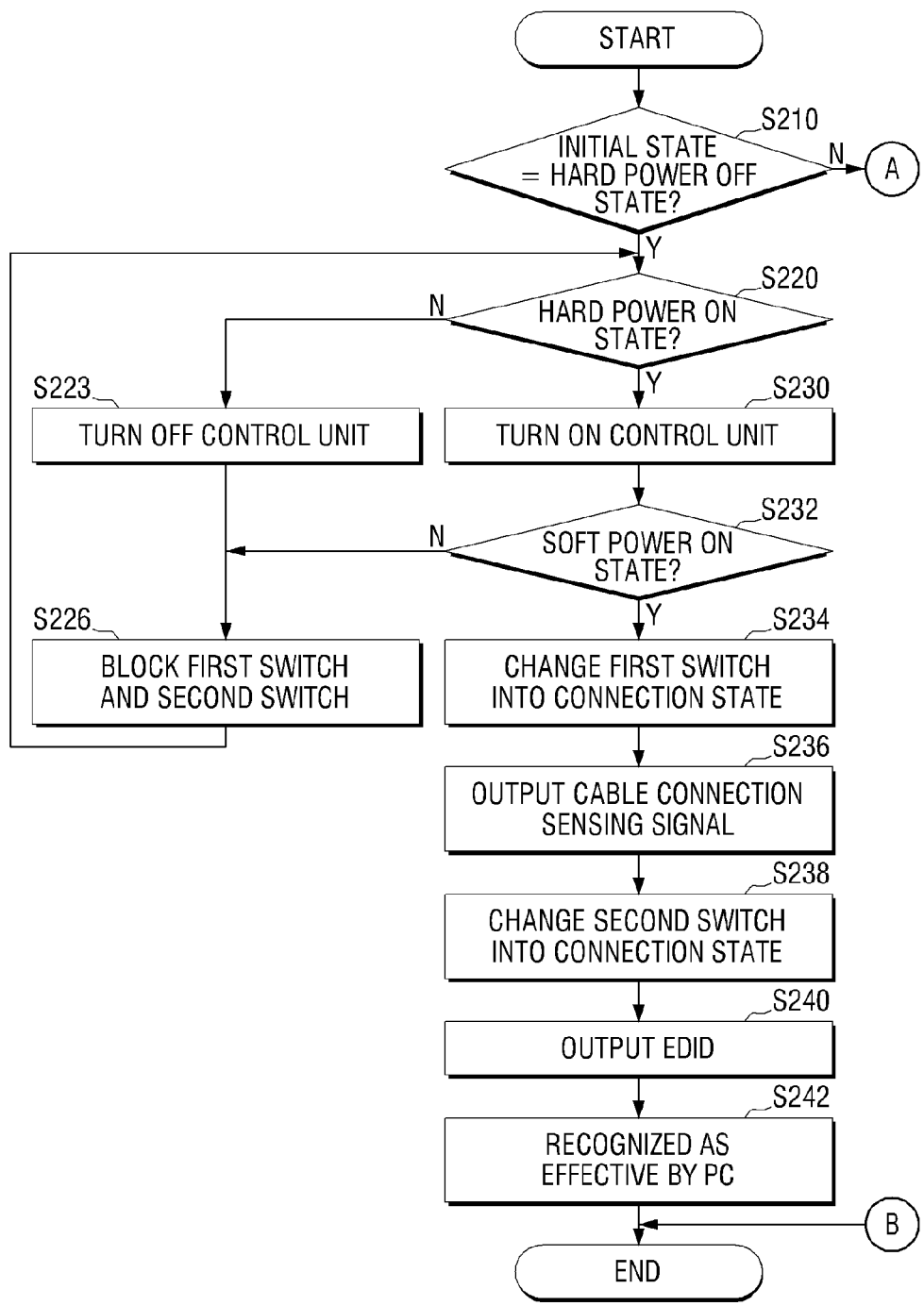
FIGS. 2A and 2B are flow charts illustrating a method for controlling a display apparatus in order to report whether or not the display apparatus is powered down to the PC according to an exemplary embodiment of the present invention.
Figure 2B:
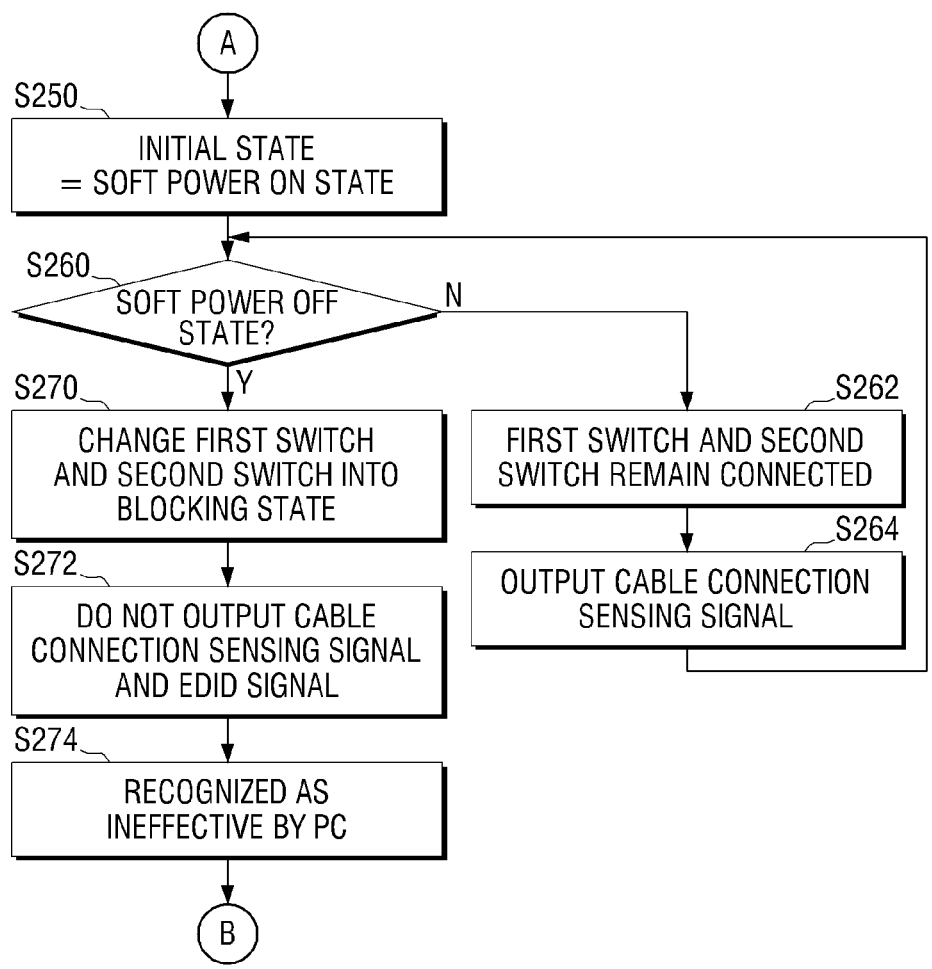

Hereinafter, a method for controlling the display apparatus 100 is described with reference to FIGS. 2A to 4. FIGS. 2A and 2B are flow charts illustrating a method for controlling the display apparatus 100 in order to report whether or not the display apparatus 100 is powered down to the PC 10 according to an exemplary embodiment of the present invention. FIG. 3 is a flow chart showing in detail that the display apparatus 100 changes from the hard power off state to the soft power on state according to an exemplary embodiment of the present invention.

In FIGS. 2A and 3, the display apparatus 100 are initially in the hard power off state. FIG. 2A focuses on the operation of the display apparatus 100.

As illustrated in FIG. 2A, if the display apparatus 100 is initially in the hard power off state (S210-Y), the display apparatus 100 determines whether or not the display apparatus 100 changes into the hard power on state (S220). The hard power on state indicates that power is supplied to the display apparatus 100, for example, when the power supply is plugged in.

If the display apparatus 100 does not change into the hard power on state (S220-N), the control unit 150 remains turned off (S223), and the first switch 120 and the second switch 130 remains blocked (S226).

If the display apparatus 100 changes into the hard power on state (S220-Y), the control unit 150 is turned on (S230). Subsequently, the display apparatus 100 determines whether or not the display apparatus 100 changes into the soft power on state (S232). If the display apparatus 100 does not change into the soft power on state (S232-N), the first switch 120 and the second switch 130 remains blocked (S226).

If the display apparatus 100 changes into the soft power on state (S232-Y), the display apparatus 100 changes the first switch 120 into the connection state (S234). Later, the display apparatus 100 outputs a cable connection sensing signal (that is, a HPD signal) to the PC 10 (S236). In addition, the display apparatus 100 changes the second switch 130 into the connection state (S238). Subsequently, the display apparatus 100 outputs EDID information stored in the EDID memory 140 to the PC 10 (S240).

Subsequently, the PC 10 recognizes the display apparatus 100 as effective (S242).

Hereinafter, operation of the display apparatus 100 and the PC 10 with respect to the process described above is described with reference to FIG. 3.

The display apparatus 100 and the PC 10 are connected through the cable 115 (S310). The display apparatus 100 is initially in the hard power off state (S320), so the first switch 120 and the second switch 130 are in the block state, and thus do not output an HPD signal (that is, HPD signal is low) (S330).

Subsequently, if the display apparatus 100 changes into the soft power on state (S340), the first switch 120 and the second switch 130 change into the connection state (that is, the switch-on state) (S350). Since the first switch 120 is in the connection state, the display apparatus 100 outputs an HPD signal to the PC 10 (that is, HPD signal is high) (S360).

The PC 10 recognizes the display apparatus 100 as ineffective before the display apparatus 100 outputs the HPD signal (S325). This is because the display apparatus is initially in the hard power off state.

Subsequently, the PC 10 receives the HPD signal from the display apparatus 100 (S363). The PC 10 recognizes that the state of the HPD signal has changed (S366), and requests that the display apparatus 100 sends EDID (S369).

The display apparatus 100 outputs the EDID to the PC 10 since the second switch 130 is in the connection state (S370). The PC 10 receives the EDID and thus obtains information on the display apparatus 100 (S375). The PC 10 recognizes the display apparatus 100 as effective (S380).

Following this process, the PC 10 can determine whether or not the display apparatus 100 is effective (that is, whether or not the display apparatus 100 is turned on).

Figure 4:
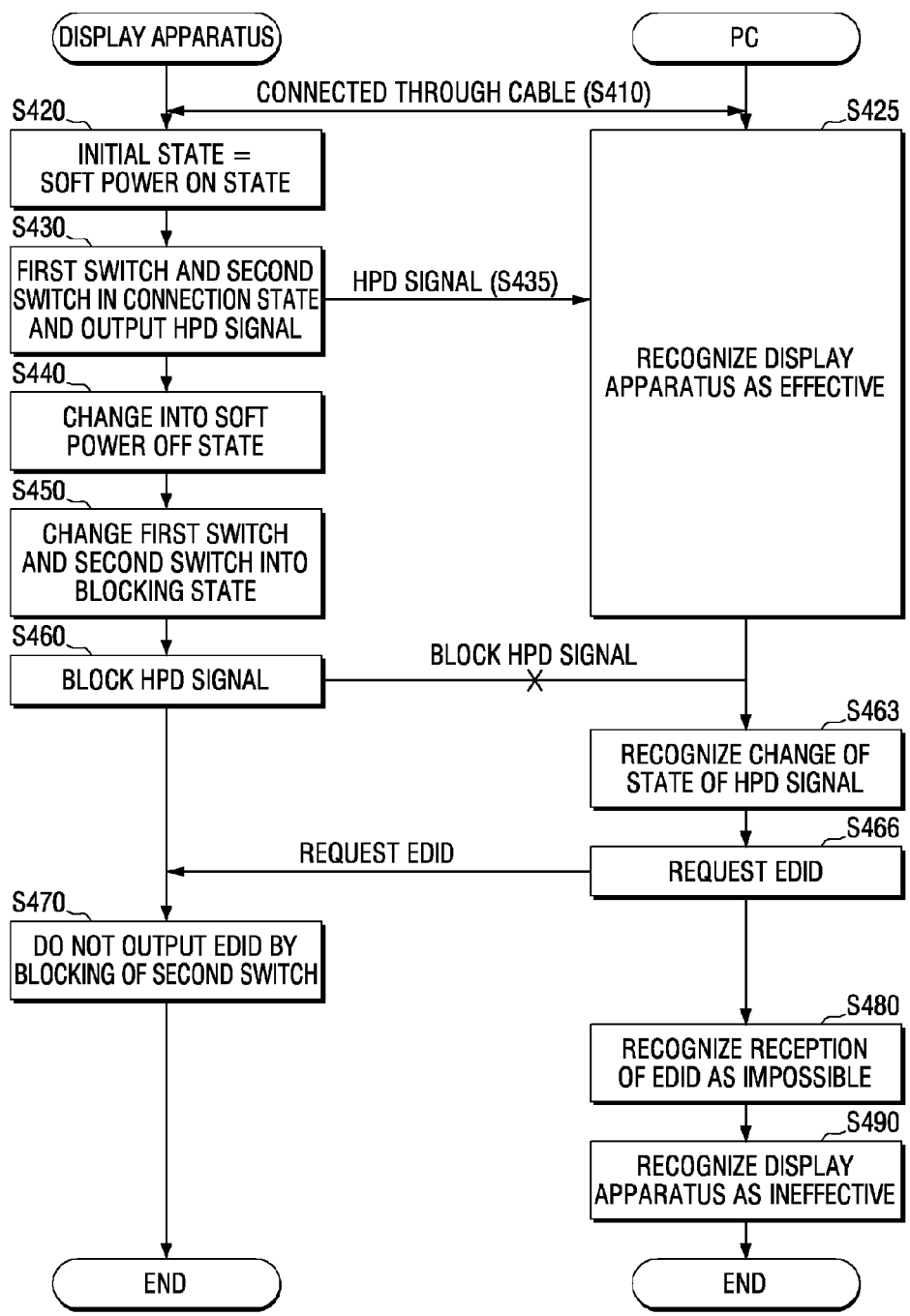
FIG. 4 is a flow chart showing in detail that a display apparatus changes from a soft power state on to a soft power off state according to an exemplary embodiment of the present invention.

Hereinafter, a method for controlling the display apparatus 100 is described with reference to FIGS. 2B and 4 showing that the display apparatus 100 are initially in the soft power on state. FIG. 2B is a flow chart focusing on the operation of the display apparatus 100. FIG. 4 is a flow chart showing in detail that the display apparatus 100 changes from the soft power on state to the soft power off state according to an exemplary embodiment of the present invention.

As illustrated in FIG. 2B, if the display apparatus 100 is initially in the soft power on state (S250-Y), the display apparatus 100 determines whether or not the display apparatus 100 changes into the soft power off state (S260).

If the display apparatus 100 does not change into the soft power off state (S260-N), the first switch 120 and the second switch 130 remain connected (that is, in the switch-on state) (S262).

If the display apparatus 100 changes into the soft power off state (S260-Y), the display apparatus 100 changes the first switch 120 and the second switch 130 into the blocking state (S270) and thus cannot output a cable connection sensing signal (that is, an HPD signal) and EDID signal to the PC 10 (S272).

Subsequently, the PC 10 recognizes the display apparatus 100 as ineffective (S274).

Hereinafter, operation of the display apparatus 100 and the PC 10 with respect to the process described above is described with reference to FIG. 4.

The display apparatus 100 and the PC 10 are connected through the cable 115 (S410). The display apparatus 100 is initially in the soft power on state (S420). Accordingly, the first switch 120 and the second switch 130 are in the connection state (S430), so an HPD signal is output (that is, HPD signal is high) (S435).

Subsequently, if the display apparatus 100 changes into the soft power off state (S440), the first switch 120 and the second switch 130 change into the blocking state (that is, the switch-off state) (S450). Since the first switch 120 is in the blocking state, the display apparatus 100 does not output an HPD signal to the PC 10 (that is, HPD signal is low) (S460).

The PC 10 recognizes the display apparatus 100 as effective before the display apparatus 100 blocks output of the HPD signal (S425). This is because the display apparatus is initially in the soft power on state.

Subsequently, the PC 10 recognizes that the state of the HPD signal has changed (that is, the HPD signal is blocked) (S463), and requests that the display apparatus 100 sends EDID (S466).

The display apparatus 100 does not output EDID to the PC 10 since the second switch 130 is in the blocking state (S470). Accordingly, the PC 10 does not receive EDID information and thus recognizes that EDID cannot be received (S480). As a result, the PC 10 recognizes the display apparatus 100 as ineffective (S490).

Following this process, the PC 10 can determine whether or not the display apparatus 100 is ineffective (that is, whether or not the display apparatus 100 is turned off).

A method for reporting the power off state of the display apparatus 100 to the PC 100 has been described so far with reference to FIGS. 2A to 4. If the display apparatus 100 operates in this manner, the PC 10 can recognize in the same manner when the cable 115 is not connected even when the display apparatus 100 is in the hard power off state or soft power off state. Accordingly, the PC 10 recognizes the display apparatus 100 as effective only when the display apparatus 100 is in the soft power on state.

If the PC 10 recognizes the display apparatus 100 as effective only when the display apparatus 100 is in the soft power on state, the PC 10 does not need to generate a signal for the display apparatus 100 in the power off state, so unnecessary power consumption and load can be reduced.

In an operating system (OS), such as Windows 7, which constitute multi-display using an HPD signal and a signal of a DDC line, a power-down display apparatus can be recognized as ineffective. For example, in Windows 7, if two display apparatuses are connected to a PC, the PC is automatically shifted to a dual monitor mode. An OS supporting such a function is an OS supporting multi-display.

Figure 5A:
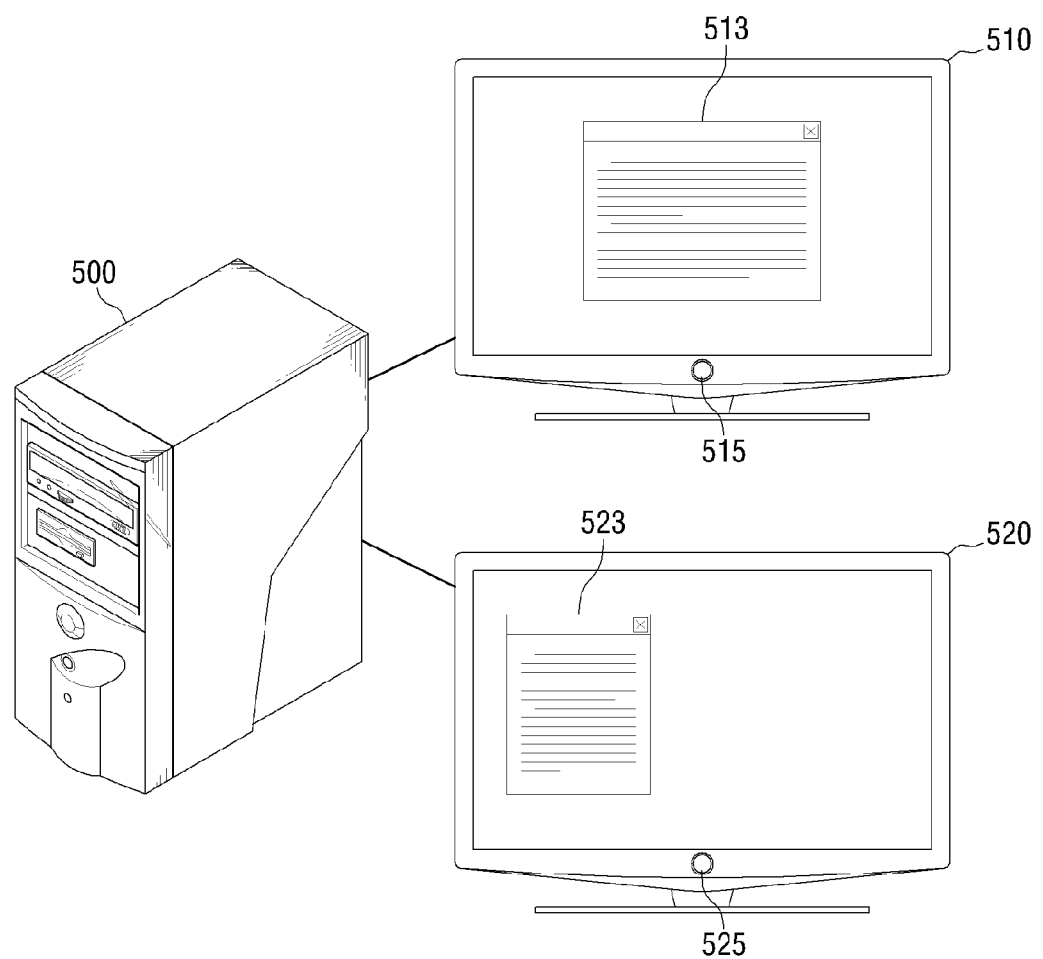
FIG. 5A shows that a first display apparatus and a second display apparatus operate as dual monitors according to an exemplary embodiment of the present invention.

As described above, the case that the display apparatus 100 according to an exemplary embodiment of the present invention constitutes multi-display is described with reference to FIGS. 5A and 5B. FIG. 5A shows that a first display apparatus 510 and a second display apparatus 520 operate as dual monitors according to an exemplary embodiment of the present invention.

As illustrated in FIG. 5A, the first display apparatus 510 and the second display apparatus 520 are connected to a PC 500, so the PC 500 operates in a dual monitor mode. In FIG. 5A, the first display apparatus 510 includes a first soft power button 515, and displays a first window 513 on screen, and the second display apparatus 520 includes a second soft power button 525, and displays a second window 523 on screen.

The soft power buttons 515 and 525 are buttons to input a soft power on command or a soft power off command in a toggle form. That is, if the user presses the soft power button 515 or 525 of the first display apparatus 510 or the second display apparatus 520 in the soft power on state, a soft power off command is input, and if the user presses the soft power button 515 or 525 of the first display apparatus 510 or the second display apparatus 520 in the soft power off state, a soft power on command is input.

In this manner, the user can use two display apparatuses through a single PC.

Figure 5B:
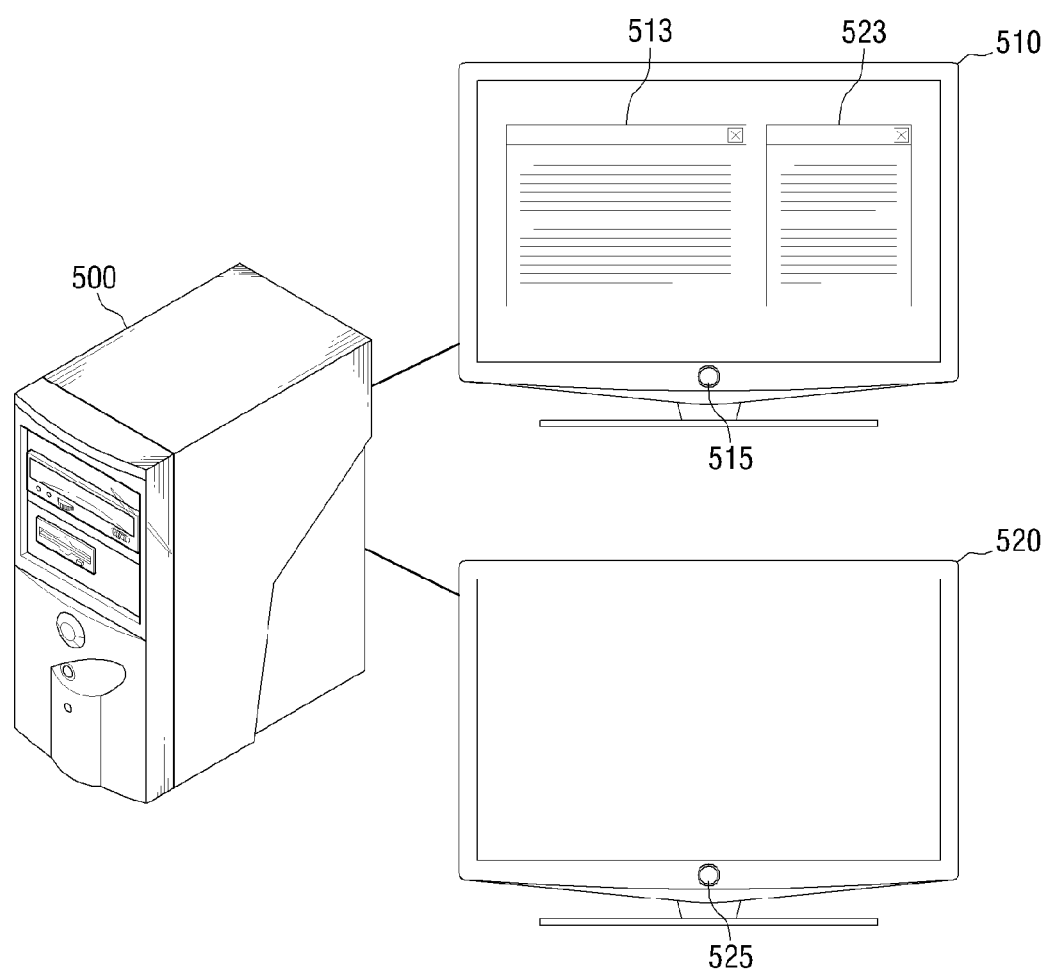
FIG. 5B shows that when a second display apparatus is in a soft power off state, a first display apparatus operates as a single monitor according to an exemplary embodiment of the present invention.

FIG. 5B shows that when the second display apparatus 520 is in the soft power off state, the first display apparatus 510 operates as a single monitor according to an exemplary embodiment of the present invention.

In FIG. 5A, if the user presses the second soft power button 525, the second display apparatus 520 turns into the soft power off state as illustrated in FIG. 5B. As a result, the first display apparatus 510 displays both the first window 513 and the second window 523 as illustrated in FIG. 5B.

That is, the PC 500 recognizes that the second display apparatus 520 turns into the soft power off state, and sets the second display apparatus 520 to be an ineffective display apparatus. Therefore, the PC 500 changes from the dual monitor mode, in which both the first display apparatus 510 and the second display apparatus 520 are used, to a single monitor mode, in which only a single display apparatus is used.

If a conventional display apparatus is used, the PC 500 can recognize the conventional display apparatus as ineffective only when the conventional display apparatus is disconnected from a cable. However, in the exemplary embodiment of the present invention, the PC 500 can recognize the second display apparatus 520 as ineffective even when the second display apparatus 520 is in the soft power off state.

Therefore, when the user wishes to change from the dual monitor mode to the single monitor mode, the user has only to press the soft power button without disconnecting a cable from one of the display apparatuses.

In this exemplary embodiment of the present invention, only two display apparatuses are illustrated and described. However, it is also possible to constitute multi-display using three display apparatuses or more.

As can be appreciated from the above description of a display apparatus and a method for controlling the display apparatus, if power is not supplied when an interface is connected to a cable, output of a cable connection sensing signal is blocked. Accordingly, the display apparatus can report to a PC that the display apparatus is in the power off state.

Therefore, among two display apparatuses used as dual monitors, if one display apparatus is turned off, the PC can automatically change into the single monitor mode.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display apparatus comprising:
    an interface which is connectable to a cable and is operable to transmit and receive signals;
    a first switch which is operable to output a cable connection sensing signal;
    a memory which stores extended display identification data (EDID);
    a second switch which is operable to output the EDID stored in the memory; and
    a control unit which determines whether the display apparatus is in a power on state or a power off state, and controls the first switch and the second switch based on a result of the determination,
    wherein the first switch blocks the cable connection sensing signal when the control unit determines that the display apparatus is in the power off state and the interface is connected to the cable, and releases the blocking state and outputs the cable connection sensing signal when the control unit determines that the display apparatus is in the power on state,
    wherein the second switch blocks the output when the control unit determines that the display apparatus is in the power off state and the interface is connected to the cable, and releases the blocking state when the control unit determines that the display apparatus is in the power on state, and
    wherein the power off state includes a hard power off state and a soft power off state.

2. The display apparatus according to claim 1, wherein if the display apparatus is in a soft power on state, the control unit further controls the first switch to output the cable connection sensing signal through the interface.

3. The display apparatus according to claim 1, wherein the cable connection sensing signal is a Hot Plug Detect (HPD) signal.

4. The display apparatus according to claim 1, wherein the second switch outputs the EDID stored in the memory by connecting the memory to a display data channel (DDC) line connected to the interface.

5. The display apparatus according to claim 1, wherein the interface is one of a Digital Video Interactive (DVI) interface and a High-Definition Multimedia Interface (HDMI) interface.

6. The display apparatus according to claim 1, wherein the display apparatus is supplied power independently from an external device connectable to the display apparatus via the interface.

7. The display apparatus according to claim 6, wherein if the external device is in a power on state, the display apparatus is operable to remain in the power off state, and wherein when the display apparatus assumes a power on state, the cable connector sensing signal becomes unblocked.

8. A method for controlling a display apparatus including an interface, the method comprising:
    determining whether the display apparatus is in a power off state and whether the interface is connected to a cable; and
    blocking an output of a cable connection sensing signal if the display apparatus is in the power off state and the interface is connected to the cable,
    blocking an output of a EDID stored in a memory which stores the extended display identification data (EDID);
    wherein the display apparatus further includes a first switch that blocks the cable connection sensing signal and a second switch blocks the output of memory, when it is determined that the display apparatus is in the power off state and the interface is connected to the cable, and releases the blocking states and outputs the cable connection sensing signal and the output of the memory when it is determined that the display apparatus is in the power on state, and
    wherein the power off state includes a hard power off state and a soft power off state.

9. The method according to claim 8, further comprising:
determining whether the display apparatus is in a soft power on state; and
    controlling the first switch to output the cable connection sensing signal through the interface if the display apparatus is in a soft power on state.

10. The method according to claim 8, wherein the cable connection sensing signal is a Hot Plug Detect (HPD) signal.

11. The method according to claim 8, wherein the apparatus further includes a memory and a second switch, and the method further comprises:
    controlling the second switch to output extended display identification data (EDID) stored in the memory through the interface if a state for not outputting the cable connection sensing signal changes to a state for outputting the cable connection sensing signal.

12. The method according to claim 11, wherein the second switch outputs the EDID from the memory to the interface by connecting the memory to a display data channel (DDC) line connected to the interface.

13. The method according to claim 8, wherein the interface is one of a Digital Video Interactive (DVI) interface and a High-Definition Multimedia Interface (HDMI) interface.

* * * * *